United States Patent [19]

Pope et al.

[11] 4,358,930

[45] Nov. 16, 1982

[54] METHOD OF OPTIMIZING PERFORMANCE OF RANKINE CYCLE POWER PLANTS

[75] Inventors: William L. Pope, Walnut Creek; Howard S. Pines, El Cerrito; Padraic A. Doyle, Oakland; Lenard F. Silvester, Richmond, all of Calif.

[73] Assignee: The United States of America as represented by the United States Department of Energy, Washington, D.C.

[21] Appl. No.: 162,345

[22] Filed: Jun. 23, 1980

[51] Int. Cl.³ .......................... F01K 7/32; F03G 7/00
[52] U.S. Cl. .................................... 60/647; 60/641.2; 60/651
[58] Field of Search .................. 60/647, 651, 655, 671, 60/641.2

[56] References Cited

U.S. PATENT DOCUMENTS

| | | | |
|---|---|---|---|
| 1,632,575 | 6/1927 | Abendroth | 60/647 X |
| 3,971,211 | 7/1976 | Wethe et al. | 60/647 X |
| 4,102,133 | 7/1978 | Anderson | 60/641.2 |
| 4,242,870 | 1/1981 | Searingen et al. | 60/651 |

Primary Examiner—Allen M. Ostrager
Assistant Examiner—Stephen F. Husar

[57] ABSTRACT

A method for efficiently operating a Rankine cycle power plant (10) to maximize fuel utilization efficiency or energy conversion efficiency or minimize costs by selecting a turbine (22) fluid inlet state which is substantially in the area adjacent and including the transposed critical temperature line (46).

33 Claims, 8 Drawing Figures

METHOD OF OPTIMIZING PERFORMANCE OF RANKINE CYCLE POWER PLANTS

The U.S. government has rights in this invention pursuant to a Contract Number W-7405-ENG-48 between the U.S. Department of Energy and the University of California.

DESCRIPTION

BACKGROUND OF THE INVENTION

The present invention relates to power plants and in particular to a method for optimizing the performance of a power plant cycle.

The production of commercial electric power requires about 30% of the total fuel consumed in the United States. Only about 40% of the available useful work of the consumed fuel is converted into electricity.

Most of this electric power is currently produced in simple reheat or combined Rankine thermodynamic cycles. Although the steam Rankine cycle has been applied worldwide for over seventy years, thermodynamic criteria have been lacking for selecting the working fluid and operating states for even a simple organic binary Rankine cycle for a given set of conditions. Such an organic binary Rankine cycle is utilized, for example, in a typical hydrothermal geothermal power plant wherein the heat source includes one or more reservoirs of geothermal brine which is supplied to the primary side of a heat exchanger of the power plant and an organic fluid, for example, a hydrocarbon, such as isobutane, or isopentane or a mixture thereof is used on the secondary side. The hydrocarbon thus used as a secondary working fluid is heated on the secondary side of the heat exchanger, and passes through the turbine of the power plant for producing electrical power.

The thermodynamic and economic performance of geothermal binary Rankine cycle power plants is influenced by a multiplicity of factors, including resource characteristics, the choice of production methods (i.e. single phase or two-phase brine production), the thermodynamic cycle configuration, subsystem characteristics, fuel cost, subsystem design and off-design efficiency factors, working fluid characteristics, and the selected independent thermodynamic process states. Power plant design is extremely complicated and operational flexibility is extremely limited because of the foregoing factors, yet it is highly desirable that the plant function at or near optimum thermodynamic and economic conditions during its entire operational lifetime. The design process has traditionally been one of multiple iterations, even when highly competent and experienced system designers have had access to powerful state-of-the-art system simulators.

Progress in the commercial exploitation of low to medium temperature goethermal brine resources by organic binary Rankine cycle power plants has been slow because of the foregoing, because resource conditions are highly site specific, and because no general plant design or operational criteria based on practical experience exists. In addition to variations in temperature, salinity, scaling potential, and porosity, hydrothermal geothermal resources obviously vary in physical size (volume) and have different recharge characteristics. Because of porosity, size, and recharge variations, reservoir temperatures will decline with time at various rates depending upon brine production. The variation in temperature of the resource causes power plant peformance to degrade, complicating commercial feasibility and operational decisions which ultimately inhibit exploitation. It has been suggested that degradation in binary cycle performance due to resource temperature decline can be mitigated somewhat by appropriate changes in the working fluid composition. However, when the working fluid is changed the cycle performance changes. Further, theoretical or empirical bases for the selection of optimum working fluids, and independent process thermodynamic states are in their infancy. It is well known that turbine efficiency is severely degraded when operated at extreme off-design conditions. Off-design characteristics of the turbine, therefore, will obviously limit the extent of changes to the working fluid and turbine operating states in response to changing resource conditions.

Accordingly, there exists a need to provide a method for operating a power plant, and in particular a Rankine cycle power plant, to achieve and maintain superior thermodynamic and economic performance.

SUMMARY OF THE INVENTION

An object of the invention is to provide a method for improving and optimizing the thermodynamic and economic operation of a power plant.

Another object of the present invention is to improve the performance of a geothermal binary Rankine cycle power plant wherein geothermal brine heats a working fluid to drive a turbine.

Still another object of the invention is to optimally operate a turbine of the power plant for maximum economic performance.

Another object of the invention is to efficiently operate a geothermal power plant under conditions of steadily decreasing geothermal brine source temperature.

Another object of the invention is to provide a method to increase the output of a binary cycle power plant under variations in the daily or seasonal heat sink conditions.

Still another object of the invention is to maximize the performance of a geothermal binary cycle power plant under different brine disposal temperature requirements.

Another object of the invention is to provide selection criteria for a turbine that will maintain high efficiency under off-design conditions.

Another object of the invention is to provide a method for optimizing the performance of a power plant system by incorporating therewith a bottoming and/or topping power plant cycle.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

To achieve the foregoing and other objects and in accordance with the purpose of the present invention, as embodied and broadly described herein, the invention may comprise a method for selecting the turbine and operating a power plant to maximize energy conversion and/or fuel utilization efficiency including the steps of vaporizing a fluid in a heat exchanger, selecting a turbine fluid inlet state which is substantially in the area of the transposed critical temperature line of the working fluid, and expanding the fluid in a turbine. The transposed critical temperature of the fluid is defined as the locus of points in the supercritical vapor region where the specific heat of the fluid is at a maximum. The transposed critical temperature, not to be confused with the pseudocritical temperature described by Kay, W. B. in "Density of Hydrocarbon Gases and Vapors," Ind. Eng.Chem. 28:1014, 1936, corresponds to maxima of the well known anomalous specific heat in the supercritical region of any fluid.

Given a suitably selected turbine, preferably, the method can be used to optimize the operation of a binary Rankine cycle power plant to maximize fuel utilization efficiency and/or energy conversion efficiency which includes the steps of vaporizing a working fluid in a supercritical primary heater, selecting a working fluid turbine inlet thermodynamic state which is substantially in the area of the transposed critical temperature line of the fluid, and expanding the fluid in a turbine.

Another aspect of the method includes the step of selecting a turbine with particular specific speed and specific size characteristics which will minimize off-design performance degradation in response to changes in the working fluid and turbine operating states.

Preferably, the method includes the step of selecting the constituents of a working fluid mixture system to provide favorable working fluid thermodynamic cycle characteristics for given conditions.

Preferably, the method also includes the step of selecting the working fluid to have a vapor saturation boundary which is at least in part substantially parallel to the condition of the fluid expanding in the turbine.

Preferably, the method also includes the step of selecting the working fluids' critical properties so that when the turbine inlet state is in the vicinity of the fluids' transposed critical temperature line, thermodynamic irreversibilities of the resulting cycle are minimized for given source and sink conditions.

It is also preferred that the method include the step of selecting the turbine inlet state so that there is substantially dry expansion of the fluid in the turbine.

Still preferably, the method includes the step of selecting the working fluid and turbine thermodynamic states to minimize off-design performance degradation.

Still preferably, the method includes the step of selecting the working fluid to achieve favorable relative slope characteristics of the vapor saturation boundary and lines of constant entropy to minimize or avoid desuperheating at the turbine exhaust.

It is also preferred that the method include the step of selecting the working fluid as described in the previous paragraph to minimize mid-expansion re-heat requirements.

Still preferably, the method includes selecting the working fluid and turbine inlet state to be compatible with source fluid exit temperature constraints imposed to avoid accelerated fouling in the primary heat exchanger or difficult source fluid disposal.

Still preferably, an aspect of the method includes changing the composition of a working fluid and turbine inlet state of a binary cycle power plant responsive to a decline in temperature of the source fluid which heats the working fluid.

Still preferably, an aspect of the method includes changing the composition of a working fluid and turbine operating states in a binary cycle power plant responsive to seasonal variations of the heat sink (wet or dry bulb temperature) of the system.

Preferably, the method also includes the step of changing the composition of a working fluid to maintain a desired turbine inlet state as the performance of the primary heat exchanger of the power plant degrades due to fouling.

Accordingly, the above invention solves many of the problems of the prior art in that it provides a method for efficiently and optimally operating a power plant to maximize energy conversion and fuel utilization efficiency at minimum cost.

BRIEF DESCRIPTION OF THE DRAWINGS

The accompanying drawings, which are incorporated and form a part of the specification, illustrate the present invention, and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

The invention includes a method to achieve superior performance by maximizing thermodynamic performance at minimum cost in power plants and heat recovery systems, and in particular in binary Rankine cycle power plants which utilize secondary working fluids.

Figure 1:
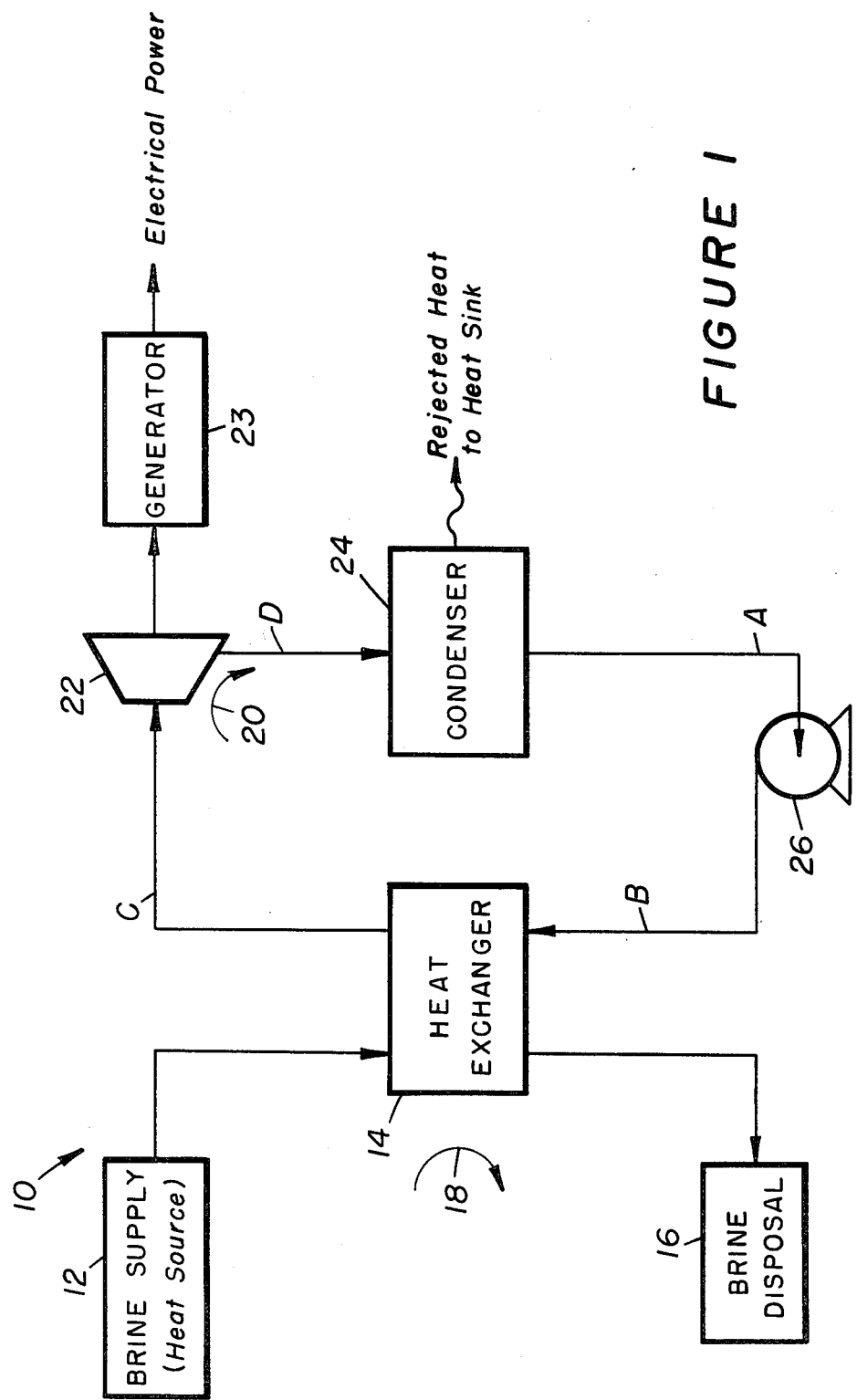
FIG. 1 depicts a schematic of a typical hydrothermal geothermal binary fluid power plant.

FIG. 1 depicts a schematic of a hydrothermal geothermal binary Rankine cycle power plant which is denoted by the numeral 10. Preferably, the primary fluid for the power plant is supplied from a brine supply reservoir or heat source 12 which can include one or more geothermal brine reservoirs. The brine from the heat source is directed through a heat exchanger or primary heater 14 of plant 10 and therefrom to a brine disposal area 16 which can include surface or pond disposal, injection into the geothermal brine supply reservoir or injection into another geothermal reservoir which may or may not communicate with the supply reservoir. The heat source 12, heat exchanger 14 and brine disposal system 16 comprise the primary loop 18 of the power plant 10 which conducts the source fluid or geothermal brine as indicated above.

The secondary loop of the power plant 10, which conducts a working fluid which is heated in the heat exchanger 14 by the geothermal brine, is identified by the numeral 20. Secondary loop 20 includes the above described heat exchanger 14, a turbine 22 where the working fluid is expanded to produce work as, for example, to operate generator 23, a condenser 24 for condensing, and in some cases, sub-cooling the working fluid, and a pump 26 for pressurizing the condensed working fluid preparatory to reintroducing it into the heat exchanger 14.

Figure 2:
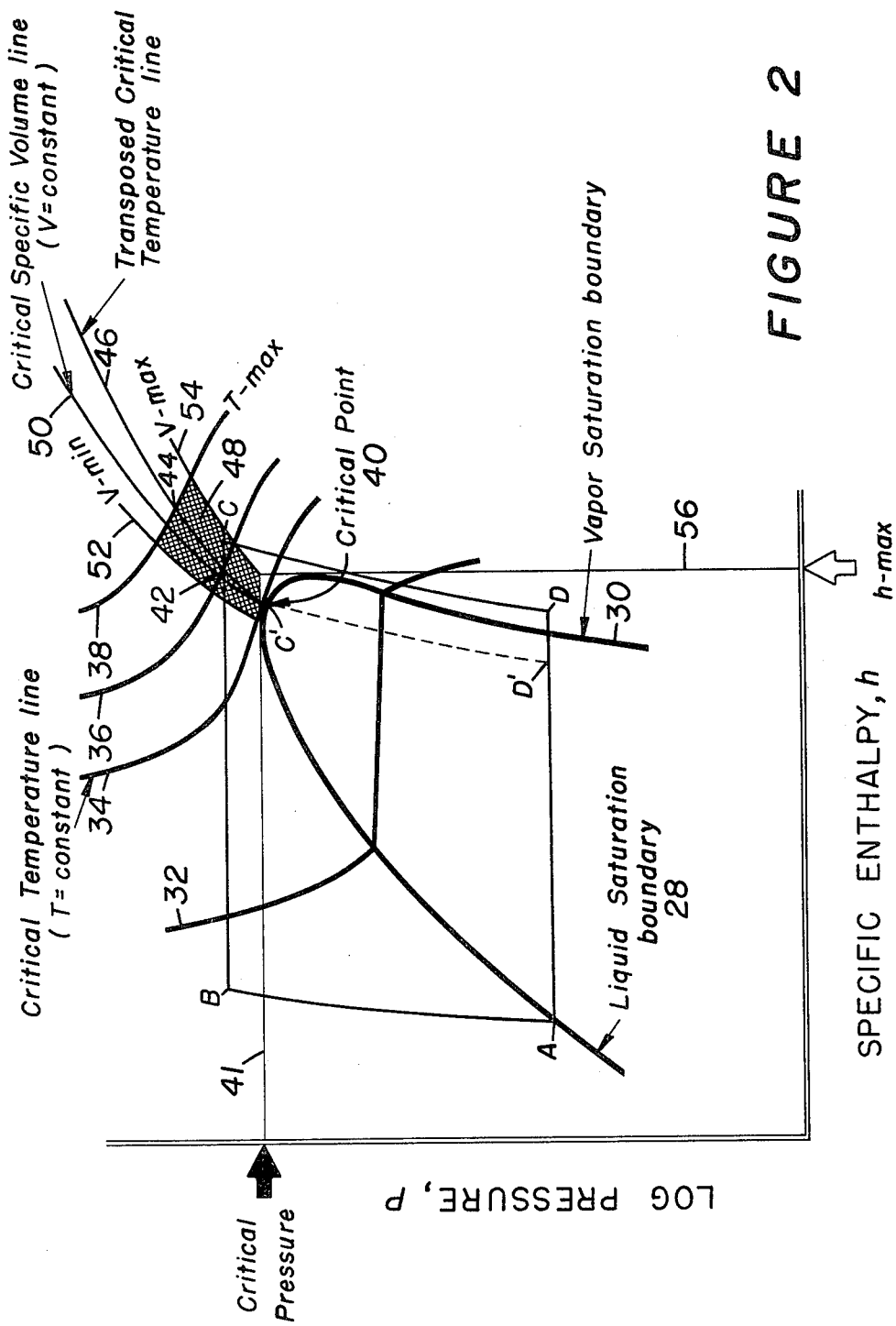
FIG. 2 depicts a pressure-enthalpy diagram of a typical organic working fluid for the above binary fluid power plant.

In a preferred embodiment, the working fluid includes a hydrocarbon or mixture thereof which can comprise saturated light hydrocarbons: methane, propane, n-butane, isobutane, n-pentane, isopentane, and neopentane, and other analogous olefins. The working fluids can also be composed of other mixtures such as Pyridine and water, and azeotropes. It is also to be understood that the working fluid can be selected to insure that, for example, the temperature conditions in the primary fluid loop are not too low to allow well-known chemical reactions to occur which may cause fouling and clogging in the primary heater 14 and/or the brine disposal system 16. Also, as the brine disposal system begins to clog, a different composition of the mixture of the working fluid can be selected to reduce the clogging. Such a change will also change the turbine inlet conditions, as will be described more fully below, to change the brine disposal system 16 injection characteristics and in particular raise the temperature of the reinjected brine to reduce clogging. Turbine inlet conditions can also be changed as described below, while maintaining a fixed fluid composition to change the brine reinjection characteristics. These working fluids have characteristic pressure-enthalpy diagrams, a sketch of a typical hydrocarbon mixture pressure-enthalpy being depicted in FIG. 2. Characteristically, the diagram includes as well known a two-phase vapor dome, which is outlined by saturated liquid line or liquid saturation boundary 28 and saturated vapor line or vapor saturation boundary 30. As is known, in the vapor dome, both gaseous and liquid states of the hydrocarbon exist. To the right of the saturated vapor line 30, the hydrocarbon is in a gaseous form. Examples of constant temperature lines are denoted by numerals 32, 34, 36 and 38. Constant temperature line 32 extends through the vapor dome area. Constant temperature line 34 tangentially touches the intersection of saturated liquid line 28 and saturated vapor line 30 at a point of inflection of said constant temperature line 34, which is known as the critical point 40. It is to be understood that the constant temperature line 34 is known as the critical temperature line. Constant temperature lines 36 and 38 also have inflection points which are denoted 42 and 44, respectively. Reference will be made to constant temperature line 38 labeled T-max later. Disposed about and through the vapor dome is a pressure-enthalpy diagram of the various thermodynamic states which the working fluid attains as it goes through the power plant 10 in a supercritical Rankine cycle. As can be seen in FIGS. 1 and 2, the path of the working fluid through the pump 26 is represented by the line AB, the path of fluid through the heat exchanger 14 is represented by the line BC, the path of the fluid through the turbine 22 is represented by the line CD and the path of the working fluid through the condenser 24 by the line DA. As is evident from FIG. 2, the primary heat exchanger 14 in the preferred embodiment operates at a supercritical pressure, and thus it does not operate as a classic boiler wherein a liquid and vapor phase are concurrently present. Accordingly, only the compressed liquid, supercritical vapor, or dense gaseous form of the working fluid are present in the heat exchanger 14. It is to be understood, however, that it is possible to supply heat to the working fluid in the primary heat exchanger 14 at other than totally supercritical conditions to achieve a supercritical thermodynamic state at the turbine inlet in the immediate vicinity of the transposed critical temperature line. Also it can be noted from FIG. 2 that the expansion of the working fluid in the turbine is a dry expansion, as line CD is substantially parallel to but to the right of the saturated vapor line 30. Thus, there is no wet, inefficient expansion of the working fluid in the turbine. It is possible, however, to have wet expansion of the fluid in the turbine and still fall within the invention as will be shown hereinbelow.

Extending from the critical point 40 and connecting all the points of inflection of the constant temperature lines 36 and 38 and the other constant temperature lines, which extend rightwardly from line 38 but which are not shown in FIG. 2, is the transposed critical temperature line 46. It is to be understood that the transposed critical temperature line 46 is defined as the locus of points in the supercritical vapor region where the fluids' specific heat is a maximum. It is to be further understood that this definition of the transposed critical temperature line is important, because it is difficult to determine inflection points on isotherms of pressure-enthalpy diagrams, whereas techniques to measure or precisely calculate specific heat maxima have been developed.

Also shown in FIG. 2 is the constant critical (specific) volume line 50. It is to be further understood that constant critical volume line 50 only approximately corresponds to transposed critical temperature line 46 except very near the critical point 40. Also shown in FIG. 2 are two other constant specific volume lines which will be defined more fully later. Constant specific volume line 52 labeled V-min is above transposed critical temperature line 46 and constant specific volume line 54 labeled V-max is below transposed critical temperature line 46.

Also shown in FIG. 2 is a line of constant specific enthalpy 56 labeled h-max which is tangent to saturated vapor line 30. Reference will be made below to the above described lines in FIG. 2 when a precise definition of cross-hatched area 48 becomes necessary.

The method of the invention comprises selecting the turbine and selecting the working fluid and all the independent process thermodynamic state parameters so that the turbine inlet state is either on or within close proximity of a point on the transposed critical temperature line for optimum design.

For any given hydrothermal geothermal resource with all the site specific complexities previously described, there generally exists a power plant type which is most appropriate. The choice is normally made on economic grounds when the plant is to operate commercially; however, exceptions exist. Hydrothermal power plant types may consist of the well-known flashed steam variety as is operational in many countries, the binary cycle variety, and so-called hybrid combinations of the foregoing, for example, the dual flashed steam-binary system currently operating but not producing power in the Niland area of Southern California (without a turbine). It is to be understood that most geothermal power plants are generically similar to many other power plants, for example, the well-known fossil or nuclear fired steam power plant, in the sense that they all operate on or utilize elements of the well-known Rankine cycle.

It is to be further understood that for any given binary or hybrid flashed steam-binary power plant there exists a particular working fluid and working fluid cycle independent thermodynamic state conditions which maximize the plant's net output power at minimum cost. As such, but depending upon many factors which are beyond the scope of this discussion, the preferred working fluid cycle may be called either a supercritical cycle or a subcritical. If the working fluid 20 in the primary heat exchanger 14 of the binary cycle depicted in FIG. 1 operates at pressures above the working fluids' critical pressure, the cycle is called a supercritical cycle. Otherwise it is called a subcritical cycle.

In most cases the supercritical binary cycle will be the preferred cycle when an appropriate working fluid is available, but because of the infancy in the state of the art of selection techniques, this point is commonly argued by power plant designers and other experts. It is emphasized and to be fully understood that it will generally not be possible to achieve full advantage of the invention when applied to existing power plants if the turbine states of an existing sub-critical power plant are simply changed to supercritical conditions. In this application, turbine efficiency may be severely degraded due to off-design characteristics, and overall plant efficiency could be worse. Proper selection of the turbine is crucial to successful implementation of the method, and thus becomes a logical first step.

Binary Rankine power cycle performance is generally good for given source and sink temperatures if the working fluid is chosen so that the primary heat exchanger 14 operates at relatively low supercritical pressures with a minimum of cycle turbine exhaust superheat and reasonably small exchanger irreversibilities. Peak economic performance is obtained for fixed turbine efficiency if the operating turbine inlet state corresponds to a point adjacent to the working fluid's transposed critical temperature line which insures dry turbine expansion with little or no exhaust superheat; however, an inlet state located within a specific area from the transposed critical temperature line would also allow the power plant 10 to have excellent performance. It is calculated with fixed turbine efficiency that acceptable performance can be obtained when the turbine inlet temperature is within the range from about the critical temperature 34 to about 30% above the critical temperature 34 and the turbine inlet pressure is in the range from about the pressure on the critical specific volume line associated with the above temperature range to about a pressure of 20% below the above associated pressure. It is to be understood that because the foregoing roughly defined region may encompass areas of sub-critical operation which are not intended, the preferred region can be more precisely, yet restrictively, defined with reference to FIG. 2.

The preferred turbine inlet operating region is represented by the cross-hatched area 48 in FIG. 2 bounded by the following lines: (1) the critical pressure line 41, (2) the line of constant specific volume 54 labeled V-max, (3) the constant temperature line 38 labeled T-max, (4) the constant specific volume line 52 labeled V-min, and (5) the critical temperature line 34, wherein V-max 54 originates at the intersection of critical pressure 41 and constant specific enthalpy line 56 tangent to vapor saturation boundary 30 and labeled h-max. Constant temperature line 38 is 20% above the critical temperature line 34, and constant specific volume line 52 is 20% below the critical specific volume 50 with all quantities determined in any absolute system of units.

It is to be further understood that the previously described preferred turbine inlet operating region, cross-hatched area 48, generally applies to all working fluid cycles 20 incorporating all turbines 22 for all binary power plants 10 as shown in the preferred embodiment of FIG. 1, even though heat source 12 and heat sink conditions may be markedly different depending upon the use intended. It is to be further understood that the above defined area 48 in FIG. 2 may be too broad for a particular use with a specific turbine because of limited off-design performance characteristics. However, if all steps of the method are applied, particularly the step of selecting the turbine, excellent performance will be achieved.

Figure 3:
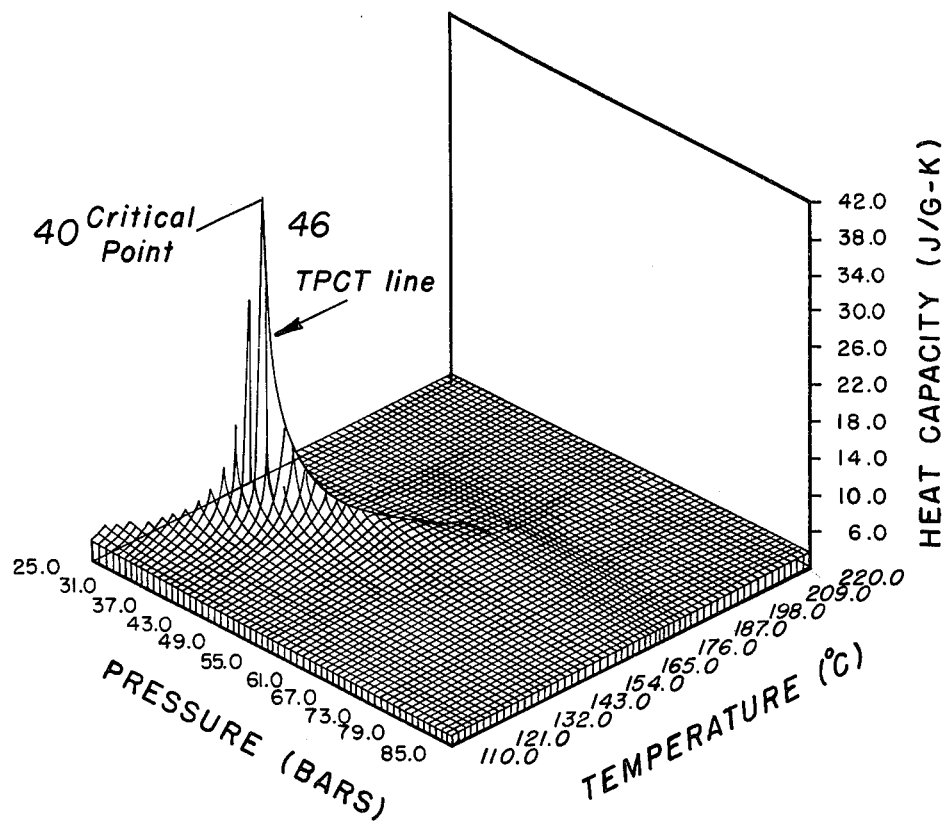
FIG. 3 depicts a three-dimensional diagram of the specific heat anomaly and its transposed critical temperature line for a typical pure organic working fluid as depicted in FIG. 2.

The three dimensional plot in FIG. 3 demonstrates the pronounced increase in the specific heat of pure isobutane in the vicinity of the critical point, commonly known as the anomalous specific heat, and the transposed critical temperature line. The plot displays the heat capacity as a function of pressure and temperature and as in FIG. 2, the transposed critical temperature line is denoted by the numeral 46 and the critical point is denoted by the numeral 40.

It is to be understood that the full extent of the specific heat anomaly extends away from the critical point to different degrees with other fluids. As such, the breadth and width of region of high performance will depend upon the fluid and the use.

Because of the roughly exponential decay of the specific heat as shown in FIG. 3, peak performance of the power plant 10 would be obtained as the turbine inlet conditions approach the critical point 40. However, other disadvantages make it more advantageous for the turbine inlet condition to be somewhat supercritical and thus somewhere in the region 48 instead of very near the critical point. These disadvantages include the fact that at the critical point, the expansion in the turbine would follow line C' D' (in phantom) in FIG. 2, and thus there would be wet expansion in the turbine for the fluid shown with an associated degradation of turbine performance. The degree of degradation depends upon the working fluid and turbine characteristics.

Figure 4:
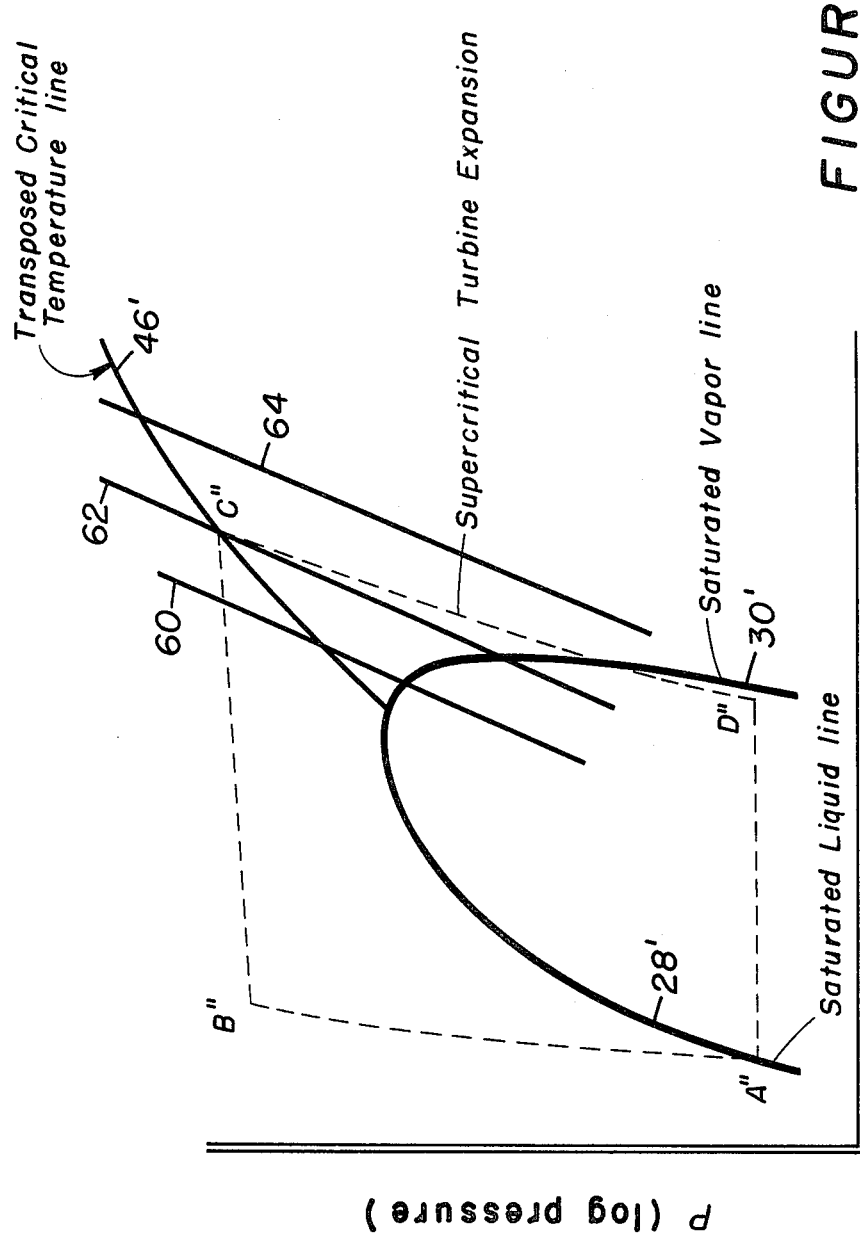
FIG. 4 depicts a pressure-enthalpy diagram for another working fluid for the power plant of FIG. 1.

However, some wet expansion may be unavoidable. Organic fluid vapor saturation curves vary in the near critical region and exhibit different degrees of retrograde behavior. An example of this behavior is illustrated by the saturated vapor line 30' for another potential working fluid as depicted in FIG. 4. In addition to variations in vapor saturation curve shapes, the angle at which lines of constant entropy intersect the saturated vapor line 30' determine, to first order, the expansion paths of the fluid in turbines, and thus have a strong influence on selected turbine inlet states.

Such lines of constant specific entropy (isentropes) which intersect saturated vapor line 30' at large angles are denoted by numerals 60, 62 and 64 in FIG. 4. This large angle of intersection is an undesirable working fluid characteristic (much like water or ammonia). However, by selecting the turbine inlet state C" at the intersection of the transposed critical line 46' and isentrope 62 as opposed to isentrope 60 or 64, some benefit from the anomaly is obtained, the degree of moisture at exhaust condition D" is maintained small, and extreme high pressures are avoided. Therefore, by selecting the turbine inlet condition close to the transposed critical temperature line 46' on an isentrope such that the turbine expansion path is substantially parallel to saturated vapor line 30', the economic performance of a binary Rankine cycle utilizing this relatively poor working fluid is improved. It is to be understood that for fluid thermodynamic characteristics as depicted in FIG. 4, multiple turbine expansion with intermediate reheat stages (not shown) is indicated, and these conditions are not beyond the scope of this invention. It is to be further understood that the saturation line 30' and isentrope lines 60, 62, and 64 intersection characteristics shown in FIG. 4 depict working fluid properties different from many hydrocarbons.

For optimal supercritical operation, the turbine inlet state should be adjacent the transposed critical temperature line, near the critical point, and result in dry expansion with little exhaust superheat. The best general way to satisfy these conditions is to choose an organic fluid mixture and to optimize the mixture component mole fractions simultaneously with other relevant independent system thermodynamic state parameters under constraint conditions suitable for the application.

It is to be understood that the fluid mixture system and optimum composition and state parameters will depend upon source and sink temperatures, the relative cost of the power plant sub-systems and the fuel, or brine, the turbine design and off-design efficiency, system constraints, and many other factors. If the turbine expansion is constrained, for example, by a safety margin restriction that expansion line C-D in FIG. 2 be well to the right of saturated vapor line 30 (to avoid turbine efficiency degradation due to moist expansion), the optimum mixture will be affected by the degree of margin assumed. However, the optimum turbine inlet states will still be adjacent to the transposed critical temperature line 46. Similarly, if the brine (or other source fluid) exit temperature from heat exchanger 14 is constrained to be at some specified temperature to avoid chemical reactions which could accelerate fouling or corrosion, the optimum chosen fluid mixture composition and turbine inlet state will be affected, but the optimum turbine inlet state will still be adjacent to transposed critical temperature line 46 in FIG. 2.

Figure 5:
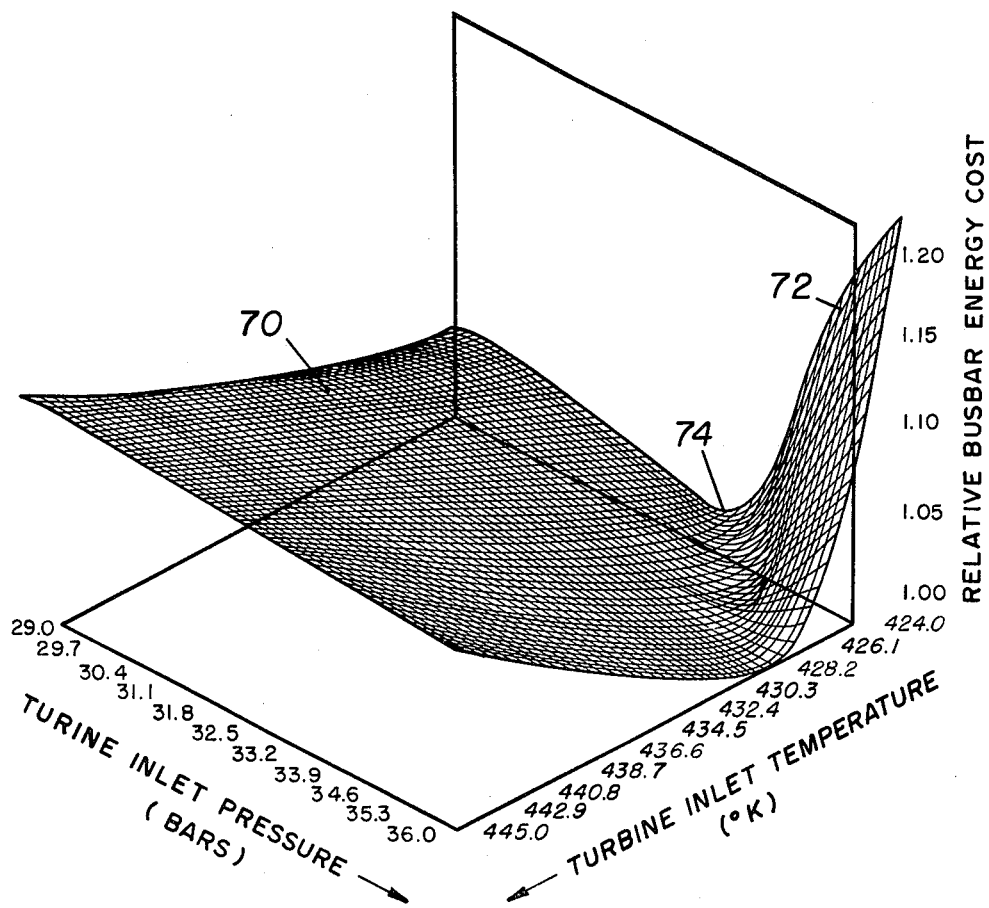
FIG. 5 depicts a typical relative busbar energy cost diagram for the power plant as depicted in FIG. 1.

The plot on FIG. 5 depicts the relative busbar energy costs plotted as a function of turbine inlet pressure and turbine inlet temperature for an isobutane/isopentane hydrocarbon mixture with a resource temperature of 182° C. The busbar energy cost, which is a well known commercial measure of the cost of producing energy, is relatively flat in the left portion 70 of the plot on FIG. 5 and corresponds to the slightly subcritical and slightly supercritical turbine inlet states to the right of the transposed critical temperature line in the superheated vapor region of FIG. 2. The region 72 on the right side of FIG. 5, where the busbar energy cost rises abruptly, corresponds to the turbine inlet states immediately above and/or to the left of the transposed critical temperature line 46 in FIG. 2, which would result in turbine expansion into the two-phase vapor region to the left of the saturated vapor line 30. This region 72 corresponds to wet expansion in the turbine and shows clearly the severe system economic penalties associated with said wet expansion in the turbine. In FIG. 5 there is a relatively broad region 74 which is slightly to the right and/or below the transposed critical temperature line in FIG. 2. This region 74 corresponds to hatched region 48 of FIG. 2 where the turbine inlet state can be safely chosen to avoid wet turbine expansion and yet perform most economically.

Figure 6:
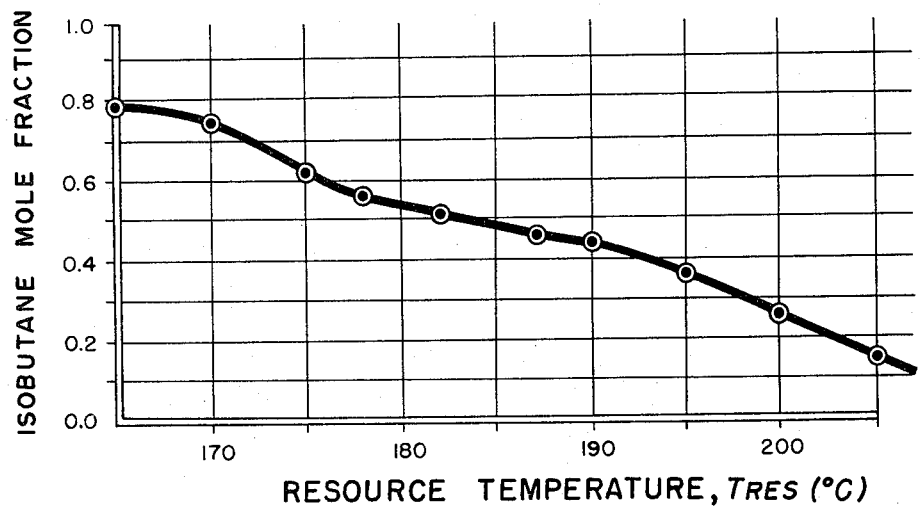
FIG. 6 depicts a graph of the composition of a typical working fluid system as a function of the temperature of the source fluid for optimizing the operation of a typical geothermal power plant cycle as depicted in FIG. 1.

FIG. 6 depicts a graph of the computed optimum isobutane mole fraction in a mixture of isobutane and isopentane plotted as a function of the resource temperature of the geothermal brine reservoir for a fixed set of unit brine cost, subsystem capital cost, and constraint assumptions. It is particularly noted that the optimum isobutane mole fraction changes significantly with modest changes is resource temperature for the plant 10. It is to be understood that other optimum mole fractions can be determined for various other mixture systems of working fluids as a function of the resource temperature of the geothermal brine reservoir.

Reference will now be made to the important step of selecting the turbine 22 of power plant 10 shown in FIG. 1. The performance characteristics, for example the design and off-design machine efficiency, is of course a function of many physical details of the machine design and the particular design type. These details differ markedly from manufacturer to manufacturer. However, for any given general type, or class, these characteristics are well known and/or readily calculated. It is known, for example, by application of well established similarity principles, that the efficiency of a given machine is a function of only four general parameters. These are the well-known specific speed ($N_s$), specific diameter ($D_s$), the Mach number (M), and the Reynolds number (Re). It is well within the state of the art to include these additional four parameters in the turbine sub-model of the overall system design simulator.

Initially, a set of calculations are performed (design mode optimizations) with minimum busbar cost as the design objective. The sub-objective of these calculations would be to determine the most appropriate range of $N_s$, $D_s$, and physical size for cost optimum systems, and calculations are done over the spectrum of current and anticipated system operating conditions (resource temperature decline, increased fuel cost, possible changes in the brine producer's return temperature requirements, etc.) It has been found in geothermal power plant simulations, for example, that for relatively large changes of the optimum working fluid mixture composition (up to 50% for hydrocarbon systems) and relatively large changes in turbine operating states wherein both the turbine inlet and the exit states change (up to 25% changes in overall pressure ratio with optimum turbine inlet states adjacent the transposed critical temperature line), that the changes in the system optimum $N_s$ and $D_s$ are extremely small (usually less than 5%). It is to be understood from the foregoing that this implies a particular type or class of turbine which will be most appropriate for the anticipated system operating conditions. It is further understood that because the changes in $N_s$ and $D_s$ are small even though turbine inlet states may change markedly (along the TPCT), the off-design performance degradation will most likely be acceptably small.

It is clear that the next step would be to acquire manufacturer information on the availability and cost of machines in this $N_s$, $D_s$ and size range, and off-design characteristics.

With this information, the system optimization calculations are repeated with the turbine sub-model of the overall system simulation in the off-design mode (fixed machine Ns, Ds, cost), again over the anticipated set of current and anticipated system conditions, with the off-design objective, minimum busbar cost. It is to be understood at this point that the machine with the lowest cost, highest efficiency, and most favorable off-design efficiency characteristics will be the obvious choice if its Ns and Ds are close to the desired range of the previously described design mode system optimizations.

It is to be understood from the foregoing that the general features of a rational method of turbine design selection has been described which is an essential first step in the method of the invention if full system performance benefits are expected. The method assumes that turbine states will be changed over limited ranges, as required, along with the fluid composition, but provides new thermodynamic criteria for specifying the changes, wherein turbine inlet states are adjacent the transposed critical temperature line, and fully accounts for (with adequate detail in turbine subsystem characterization) potentially significant off-design machine efficiency degradation.

It is to be further understood that the optimum mixture system and composition within said system and the optimum cycle state conditions depend strongly upon the particular application, i.e. the source and sink temperatures, the price of the fuel, the prevailing cost of power plant subsystems, and constraint conditions, but that the precedures generally outlined herein can be used to determine the optimum design or off-design conditions.

Table 1 is an example of the typical input assumptions and the calculated optimum performance results and operating states for the power plant cycle 10 of FIG. 1 for a working fluid of pure isobutane.

TABLE 1

| A. Fixed Conditions (Assumptions) | |
|---|---|
| Parameter | Assumption |
| Produced Fluid Sate at Wellhead | Saturated liquid at T resource |
| "Brine" Salinity | 0.0 (Pure $H_2O$) |
| Drawdown Factor (KPa/Kg/sec) (Pressure drop/rate of flow) | 22.8 |
| Well Depth (m) | 1830. |
| Well Friction and Heat Transfer | Ignored |
| Net Cycle Output Power (MWe) | 50. |
| Plant Capacity Factor | 0.85 |
| Design Wet Bulb Temp. (°C.) | 26.7 |
| Make-up Water Temp. (°C.) | 32.2 |
| Hydrocarbon Expander: | |
| Dry Stage Adiabatic Efficiency | 0.85 |
| Maximum Stage Pressure Ratio | 1.8 |
| Stage Efficiency Reduction (% drop per % exhaust moisture) | 1.0 |
| Generator Efficiency | 0.98 |
| Motor Efficiency (all) | 0.95 |
| Pump Efficiency (all surface pumps) | 0.80 |
| Down-hole Production Pump | 0.50 |
| Overall Heat Transfer Coefficients | ($W/m^2$ °K.) |
| Supercritical Heat Exchanger | 1514. |
| Supercritical Primary Heat Exchanger | |
| ° Pre-Heating | 1514. |
| ° Boiling | 2422.4 |
| ° Superheating | 1514. |
| Condensing | 566.7 |
| Desuperheating | 237.5 |
| Sub-System Costing: | |
| Capital Cost Equation | GEOTHM MODEL |
| Capital Cost Coefficients | Normalized (to EPRI ER-301) |
| Operating & Maintenance Costs | Normalized (to EPRI ER-301) |
| Direct & Indirect Cost Factors | Normalized (to EPRI ER-301) |
| Brine Cost ($/MBtu) | Normalized (to EPRI ER-301) |
| Water Properties | GEOTHM MODEL |
| Working Fluid Properties | Starling Specific MBWR (1975) |
| Turbine Constraint | Inlet entropy ≧ max. sat. vapor entropy |
| Brine Exit (Return) Constraint | None |
| No. of Independent Parameters | Six |
| Design Objective | Minimize busbar cost |

| B. Computed Optimum (minimum busbar cost) Design | | |
|---|---|---|
| Parameter | | Computed Value |
| (1.) | Overall System Performance | |
| | busbar energy cost | 36.90 mills/kwh |
| | resource utilization effncy. | 41.62% |
| | net cycle efficiency | 11.21% |
| | brine exit temperature | 341.47° K. (155.0° F.) |
| (2.) | Working Fluid Characteristics | |
| | isobutane mole fraction | 1.0 |
| | critical pressure | 36.48 bar |
| | critical temperature | 408.14° K. |
| (3.) | Cycle State Conditions | |
| | pump exit pressure | 46.24 bar |
| | turbine inlet temperature | 428.44° K. |
| | turbine inlet pressure | 42.79 bar |
| | condensing temperature | 316.58° K. |
| | primary heat exchanger pinch point delta T | 6.56° K. |
| | condenser pinch point delta T | 2.87° K. |
| | cooling tower approach delta T | 5.31° K. |
| (4.) | Turbine Inlet Proximity to Transposed Critical Temperature Line | |
| | $[(T_{TPCT})P_T]_{OPT}/(T_T)_{OPT}$ | 0.980 |
| | $[(P_{TPCT})T_T]_{OPT}/(P_T)_{OPT}$ | 1.116 |

Another example of the optimum performance results for the various points on the power plant 10 with a working fluid, which comprises a mixture of isobutane and isopentane, for identical input assumptions is as shown in Table 2.

TABLE 2

| | | |
|---|---|---|
| A. | Fixed Conditions (Assumptions) The fixed conditions for this example are identical to those listed in Table 1 except the working fluid is a mixture of isobutane and isopentane, and there are seven independent thermodynamic state parameters. | |
| B. | Computed Optimum (minimum busbar cost) Design | |
| | (1.) Overall System Performance | |
| | busbar energy cost | 34.82 mills/KWh |
| | resource utilization efficiency | 43.71% |
| | net cycle efficiency | 11.48% |
| | brine exit temperature | 338.54° K. (149.7° F.) |
| | (2.) Working Fluid Characteristics | |
| | isobutane mole fraction | 0.59 |
| | critical pressure | 32.64 bar |
| | critical temperature | 419.65° K. |
| | (3.) Cycle State Conditions | |
| | pump exit pressure | 38.13 bar |
| | turbine inlet temperature | 427.04° K. |
| | turbine inlet pressure | 34.68 bar |
| | condensing (bubble point) temperature | 311.59° K. |
| | primary heat exchanger pinch point delta T | 5.47° K. |
| | condenser pinch point delta T | 4.81° K. |
| | cooling tower approach | 4.89° K. |
| | (4.) Turbine Inlet Proximity to Transposed Critical | |

TABLE 2-continued

| Temperature Line | |
|---|---|
| $[(T_{TPCT})P_T]/(T_T)_{OPT}$ | 0.993 |
| $[(P_{TPCT})T_T]_{OPT}/(P_T)_{OPT}$ | 1.041 |

A brief discussion of the comparative performance of the two binary Rankine geothermal power plants just described is in order. It can be noted from Table 1 and Table 2 that the mixture binary cycle, Table 2, out-performs the pure isobutane cycle, Table 1, in all relevant details. It is to be understood that isobutane is the most frequently advocated pure fluid for the 182° C. resource temperature range, so it is not surprising that differences between these two designs are not more dramatic. In the examples, 1976 brine prices were assumed. At 1980 brine prices, the difference in annual fuel savings between the two designs would be the order of 1.5 million dollars for each 50 MWe (net) plant.

Figure 7:
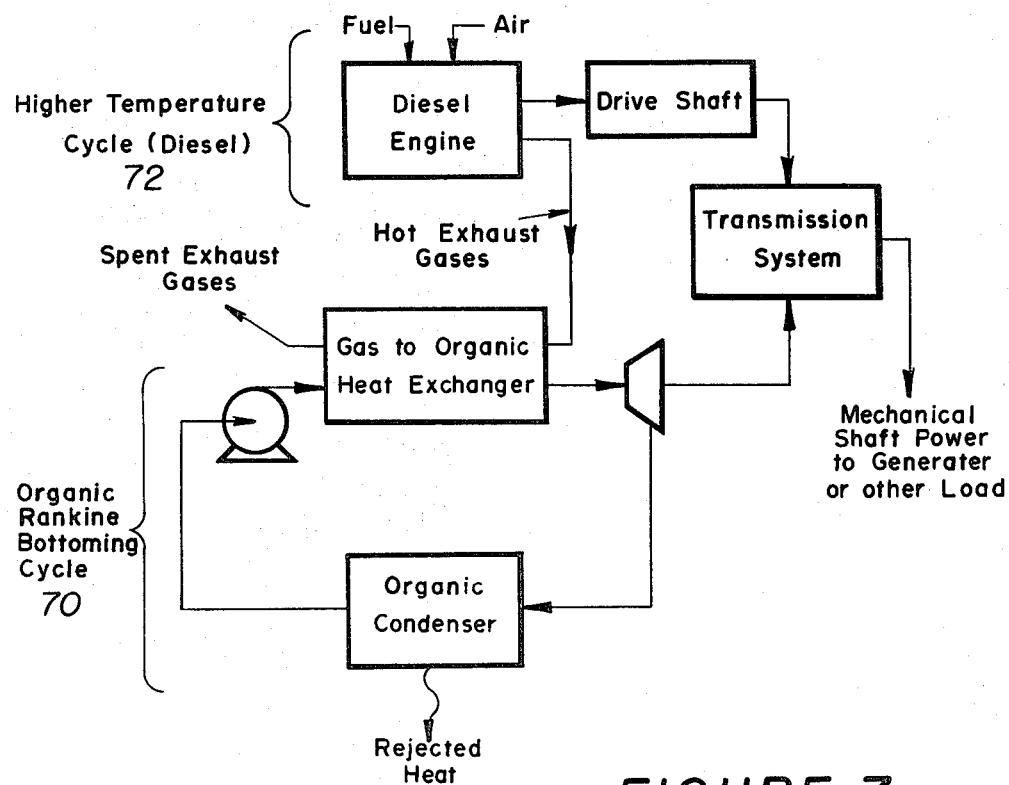
FIG. 7 depicts a schematic diagram which shows the secondary fluid loop of the power plant cycle of FIG. 1 used as a bottoming cycle to a Diesel engine.

The operation of the system and the industrial applicability is as defined hereinabove. Further to the industrial applicability, the working fluid loop 20 of the above Rankine power plant 10 can be used as a bottoming cycle to utilize the waste heat rejected from a higher temperature process such as a Brayton gas cycle, Diesel engine, or other Rankine cycle to heat the working fluid in the above cycle as depicted in FIG. 2 to increase the power production, mechanical work output, or overall process efficiency of the entire system (or produce electricity at lower cost than the higher temperature process alone for the same net output). Such a bottoming cycle is depicted in FIG. 7 and denoted with the numeral 70. The higher temperature process is denoted with the numeral 72.

Figure 8:
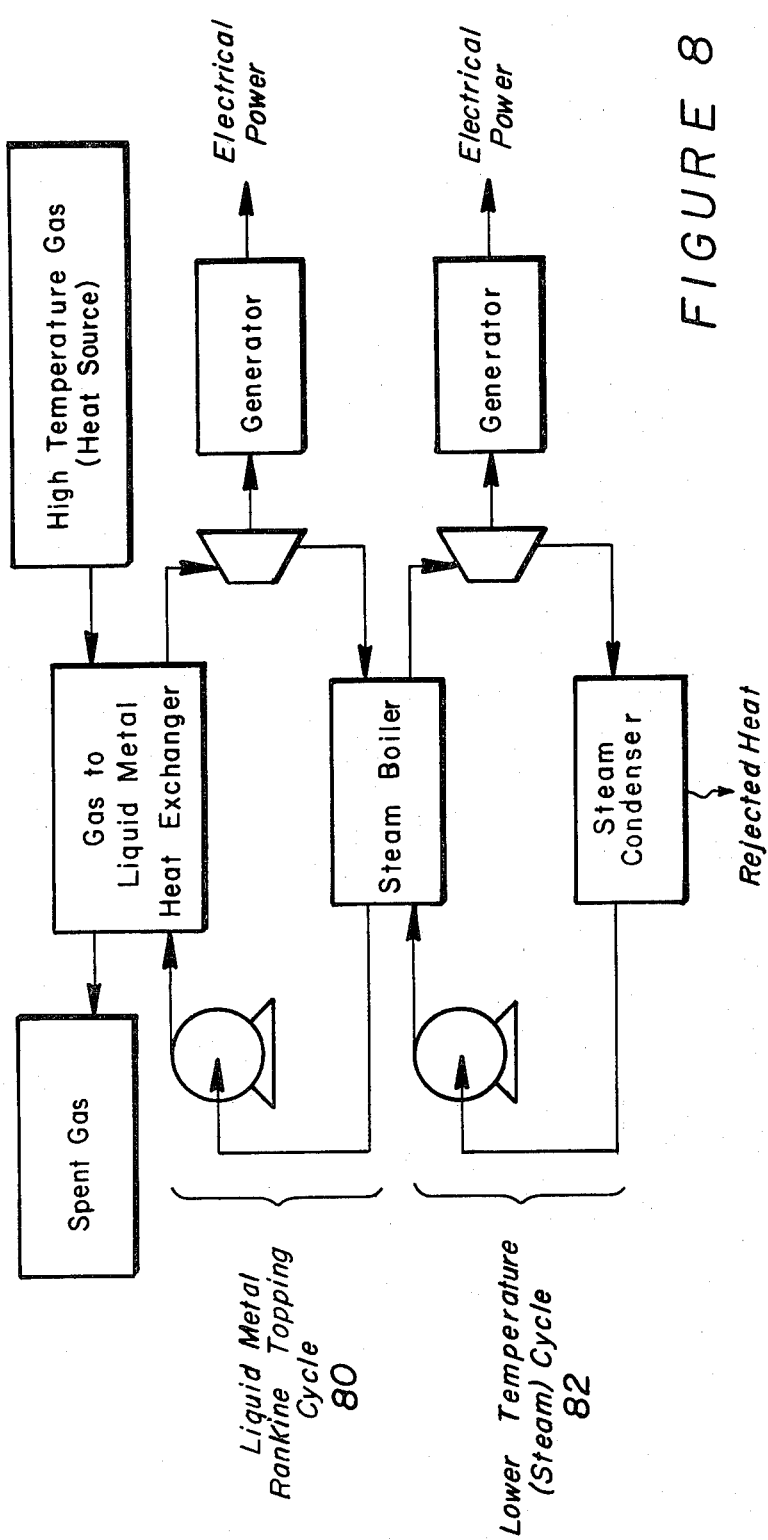
FIG. 8 depicts a schematic diagram showing the secondrary fluid loop of the power plant cycle of FIG. 1 utlizing a gas heated, liquid metal working fluid used as a topping cycle to a typical advanced steam power plant.

Similarly, a liquid metal working fluid loop 20 of the above Rankine power plant 10 can be used (with a suitable heat source and gas-to-liquid-metal heat exchanger) as a topping cycle (FIG. 8) wherein heat rejected from this topping cycle is utilized in a lower temperature cycle steam power plant, for example, to increase power production, mechanical work output, or overall process efficiency, or produce electricity at potentially lower cost than the lower temperature process alone for the same net output. In FIG. 8, the topping cycle is denoted by the numeral 80 and the lower temperature cycle by the numeral 82. It is to be understood that a supercritical liquid metal Rankine topping cycle for steam power plants may be beyond the current state of the art of material technology; however, the concept is well within the scope of the invention.

It should also be understood that numerous other thermodynamic cycles can be coupled with the cycle of FIG. 1 in a co-generation mode where a portion of the available energy from the system is converted into electric power and a portion is converted into mechanical work or useful heat. This useful heat can be obtained at the various condensing temperature levels of the subsystems, or alternatively, split turbines can be used wherein some of the process heat can be extracted at temperatures above and between the chosen condensing temperature levels.

Still, it is to be understood that, as depicted in FIG. 6, calculations can be made to determine the working fluid composition and appropriate new independent cycle states to continually maximize power output in response to a declining source temperature. For example, in FIG. 6 as the source temperature declines, the mole fraction of isobutane can be increased by adding isobutane to a reservoir of the process working fluid (i.e. hotwell) and subtracting the isobutane/isopentane mixture at another point in the working fluid cycle. This is also true for changing the composition of the working fluid to maintain a desired turbine inlet state as heat exchanger performance degrades due to fouling; however, both the composition and the turbine inlet state may be changed for this purpose depending upon off-design characteristics with the new composition. This is also true for changing the composition as injection temperature requirements change in response to changing injection pumping demands (clogging injection wells).

Also, it is to be understood that the characteristics of turbine 22 in the above closed Rankine cycle can be selected to minimize efficiency degradation in response to daily and seasonal sink temperature variations as taught in Lawrence Berkeley Laboratory Publication LBL-7040 and entitled "The Thermodynamic and Cost Benefit of a Floating Cooling Geothermal Binary Cycle Power Plant at Heber, California," April, 1978, and presented at the 1978 annual meeting of the Geothermal Resources Council.

Still further, the turbine characteristics can also be selected to minimize efficiency degradation during load shedding. The turbine can operate a generator which generates electrical power which is fed into a power grid. When a decrease in power demand occurs, load shedding is performed wherein the output of the generator is cut back. As is known with properly selected turbine characteristics, efficiency degradation during load shedding can be minimized.

Summarizing the geothermal binary Rankine cycle power plant can be periodically optimized for any reasonable objective (i.e. maximize net output or minimize costs) when the working fluid is slightly supercritical, the specific composition of the working fluid is optimized for each set of resource temperature, fuel cost, and brine return temperature conditions, the turbine inlet state is optimized to lie on or substantially adjacent the optimum working fluids' transposed critical temperature line, and where the turbine expansion is dry with minimum exhaust superheat.

It is to be understood that other cycles besides the above binary Rankine cycle can efficiently employ the method of the invention.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in varous embodiments and with various modifications as are suited to the particular use contemplated. It is intended that the scope of the invention be defined by the claims appended hereto.

What is claimed is:

1. A method for operating a turbine to maximize energy conversion and/or fuel utilization efficiency including the step of:
    expanding working fluid in a turbine with a turbine fluid inlet state which is substantially in the supercritical vapor region and substantially where the specific heat of the working fluid is a maximum.

2. A method for operating a turbine to maximize energy conversion and/or fuel utilization efficiency including the step of:
  expanding working fluid in a turbine with a turbine fluid inlet state which is substantially in the area adjacent and including the transposed critical temperature line of the fluid.

3. A method for operating a binary Rankine cycle power plant to maximize energy conversion and/or fuel utilization efficiency including the steps of:
  vaporizing a working fluid in a supercritical heat exchanger; and
  expanding the working fluid in a turbine with a turbine fluid inlet state which is substantially in the supercritical vapor region and substantially where the specific heat of the working fluid is a maximum.

4. A method for operating a power plant to maximize energy conversion and/or fuel utilization efficiency including the steps of:
  vaporizing a working fluid in a heat exchanger to supercritical exit conditions; and
  expanding the working fluid in a turbine with a turbine fluid inlet state which is substantially in the supercritical vapor region and substantially where the specific heat of the working fluid is a maximum.

5. A method for operating a power plant to maximize energy conversion and/or fuel utilization efficiency, including the steps of:
  vaporizing a fluid in a heat exchanger; and
  expanding the fluid in a turbine with a turbine fluid inlet state which is substantially in the area adjacent and including the transposed critical temperature line of the fluid.

6. The method of claim 5 wherein the step of expanding the fluid in a turbine with a turbine fluid inlet state which is substantially in the area adjacent and including the transposed critical temperature line of the fluid includes the step of expanding the fluid in a turbine with the turbine fluid inlet state such that the turbine inlet state on a pressure-enthalpy graph has substantially the following boundaries:
  (1) the constant critical temperature line;
  (2) the critical pressure line;
  (3) the line of constant specific volume extending from the intersection of the critical pressure line and the maximum constant specific enthalpy line tangent to the vapor saturation boundary;
  (4) the constant temperature line which is 20% above the critical temperature line; and
  (5) the line of constant specific volume which is 20% below the critical specific volume.

7. A method for operating a Rankine cycle power plant to maximize thermodynamic and economic performance including the steps of:
  vaporizing a fluid in a supercritical primary heater;
  expanding the fluid in a turbine with a turbine fluid inlet state which is substantially in the area adjacent and including the transposed critical temperature line of the fluid; and
  condensing the fluid exhausted from the turbine;
  returning the condensed fluid to the heater.

8. The method of claim 7 wherein the step of expanding the fluid in a turbine with a turbine fluid inlet state which is substantially in the area adjacent and including the transposed critical temperature line of the fluid includes the step of expanding the fluid in a turbine with the turbine fluid inlet state such that the turbine inlet state on a pressure-enthalpy graph has substantially the following boundaries:
  (1) the constant critical temperature line;
  (2) the critical pressure line;
  (3) the line of constant specific volume extending from the intersection of the critical pressure line and the maximum constant specific enthalpy line tangent to the vapor saturation boundary;
  (4) the constant temperature line which is 20% above the critical temperature line; and
  (5) the line of constant specific volume which is 20% below the critical specific volume.

9. The method of claim 7, wherein the fluid has a vapor saturation boundary as defined on a pressure-enthalpy diagram, including the step of selecting the fluid to have a vapor saturation boundary which is at least in part parallel to the condition, as represented on the pressure-enthalpy diagram, of fluid expanding in the turbine.

10. The method of claim 7 including the step of selecting the fluid so that there is substantially dry expansion of fluid in the turbine.

11. The method of claim 7 including the step of selecting the working fluid so that particular chemical reactions can be avoided that would accelerate fouling in the primary heater.

12. The method of claim 7, wherein the Rankine cycle power plant uses geothermal brine and has a brine disposal system, including the steps of heating the working fluid with geothermal brine and selecting the working fluid so that particular chemical reactions can be avoided that could cause clogging in the brine disposal system.

13. The method of claim 7 including the step of:
  using a working fluid composed of a mixture of isobutane and isopentane.

14. The method of claim 7 including the step of:
  using a working fluid selected from the group consisting of methane, ethane, propane, n-butane, isobutane, n-pentane, isopentane, and neopentane and mixtures thereof.

15. The method of claim 7 including the step of:
  using a working fluid composed of a mixture of Pyridine and water.

16. The method of claim 7 including the step of:
  using a working fluid composed of an azeotrope.

17. The method of claim 7 including the step of:
  vaporizing the fluid in the heater with heat rejected from a higher temperature process.

18. The method of claim 7 including the step of:
  using the vaporizing, selecting, expanding, condensing and returning steps as a bottoming cycle for efficiently using waste heat rejected from a higher temperature process.

19. The method of claim 7 including the step of:
  using the vaporizing, selecting, expanding, condensing and returning steps as a topping cycle rejecting heat to a lower temperature cycle to increase overall power output and process efficiency.

20. The method of claim 7 wherein the vaporized fluid is a working fluid and including the steps of:
  vaporizing the working fluid in the heater with a source fluid; and
  changing the composition of the working fluid responsive to a declining temperature of the source fluid.

21. The method of claim 20 including the step of:

using a working fluid composed of a mixture of isobutane and isopentane.

22. The method of claim 20 including the step of:
using a working fluid selected from the group consisting of methane, ethane, propane, n-butane, isobutane, n-pentane, isopentane, and neopentane and mixtures thereof.

23. The method of claim 20 including the step of using a working fluid composed of a mixture of Pyridine and water.

24. The method of claim 7 including the step of:
changing the composition of the fluid to maintain a desired turbine inlet state as the primary heater degrades due to fouling.

25. The method of claim 7 wherein the Rankine cycle power plant uses geothermal brine and has geothermal brine injection wells including the step of:
changing the composition of the fluid to maintain a desired turbine inlet state as clogging increases in the injection wells.

26. The method of claim 7 wherein the Rankine cycle power plant uses geothermal brine and has geothermal brine injection wells including the step of changing the turbine inlet operating conditions to another point in the area adjacent and including the transposed critical temperature line as brine injection characteristics change.

27. The method of claim 7 including the step of:
co-generating electric power and mechanical work or process heat from the step of expanding fluid in the turbine.

28. The method of claim 7, wherein the environment is used as a heat sink, including the step of:
selecting turbine characteristics to minimize efficiency degradation in response to heat sink variations.

29. The method of claim 7 including the step of:
selecting turbine characteristics to minimize efficiency degradation as the power output requirements of the power plant are reduced.

30. The method of claim 7, wherein the Rankine cycle power plant uses geothermal brine from a geothermal brine source including the step of:
selecting turbine characteristics to minimize efficiency degradation in response to a temperature decline in the geothermal brine source.

31. The method of claim 7 including the step of:
using a working fluid comprising an olefin.

32. The method of claim 7 including the step of:
using a working fluid comprising a saturated light hydrocarbon.

33. The method of claim 7 including the step of:
using a working fluid comprising hydrocarbons and mixtures thereof.

* * * * *